Jan. 8, 1935.　　　M. C. STEARNS　　　1,987,376
STORAGE APPARATUS
Filed May 28, 1932　　2 Sheets-Sheet 1
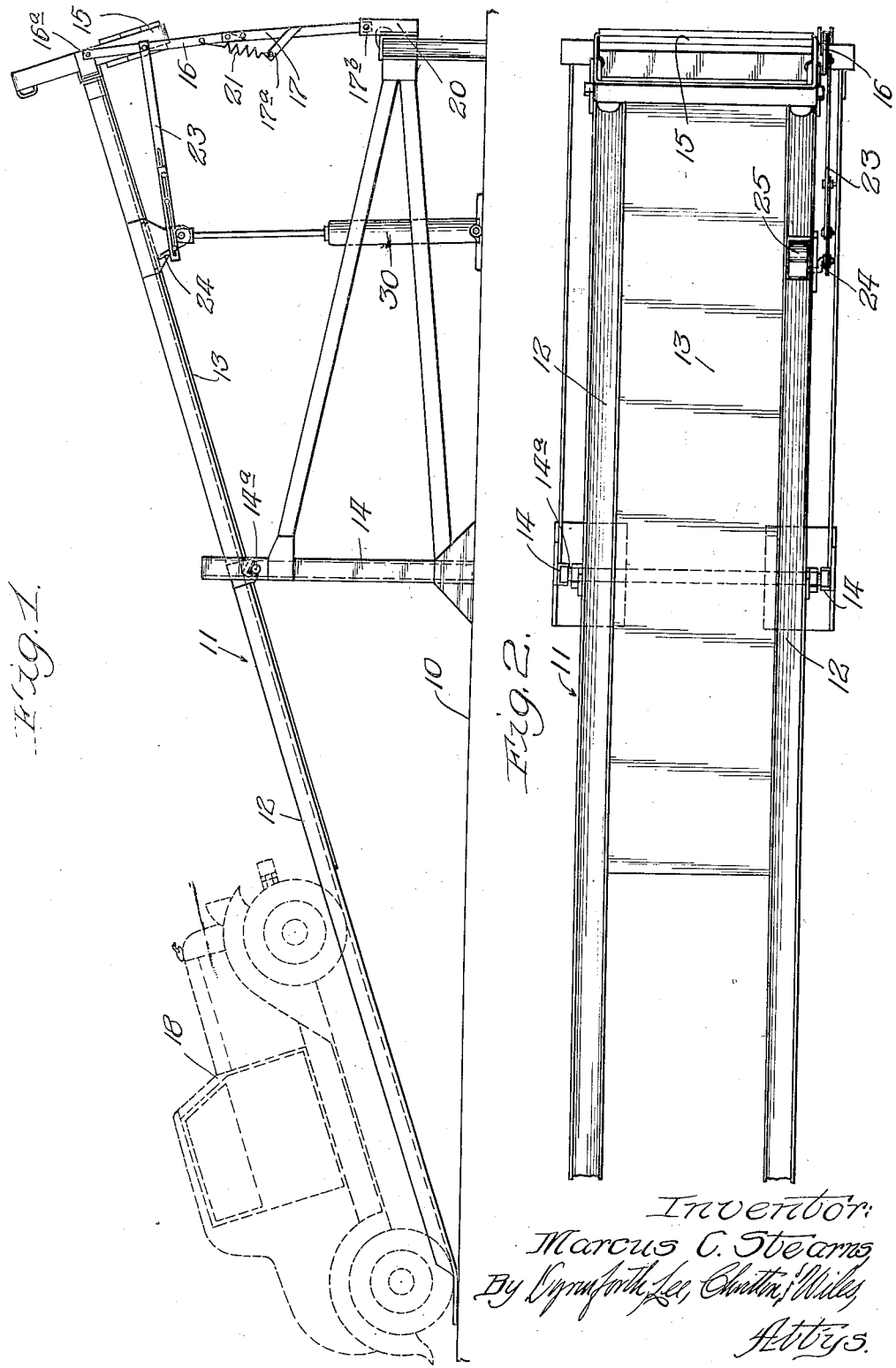

Jan. 8, 1935.  M. C. STEARNS  1,987,376
STORAGE APPARATUS
Filed May 28, 1932    2 Sheets-Sheet 2
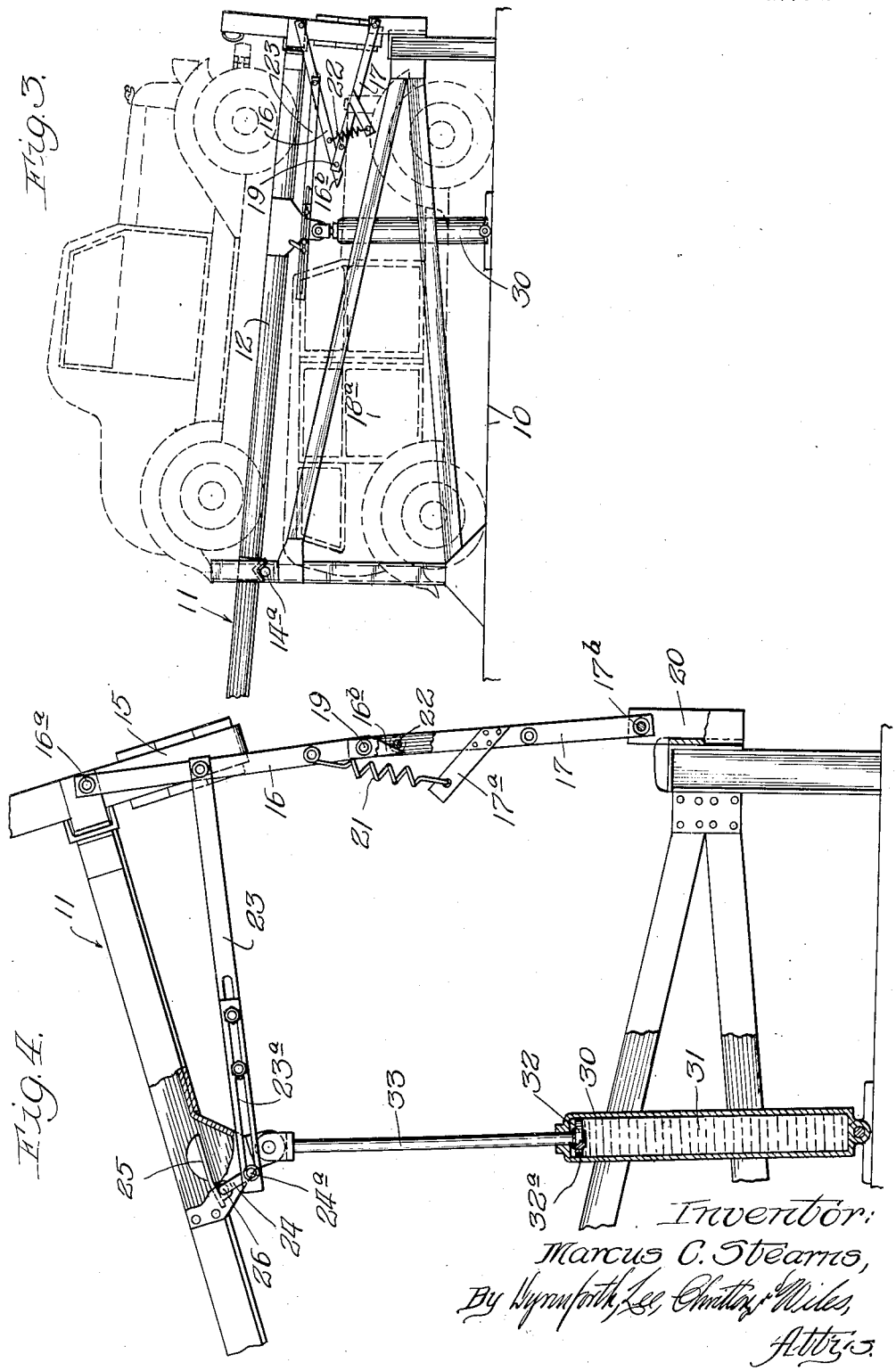

Patented Jan. 8, 1935

1,987,376

UNITED STATES PATENT OFFICE 1,987,376

STORAGE APPARATUS

Marcus C. Stearns, Chicago, Ill.

Application May 28, 1932, Serial No. 614,227

3 Claims. (Cl. 214—1)

This invention relates to improvements in storage apparatus and, more especially, such apparatus for the storage of vehicles, for example, motor vehicles.

By the use of my invention, storage space may be conserved. I am able to store practically twice as many cars in a given area by the use of my invention.

The apparatus required in the practice of my invention is exceedingly simple in construction and operation, thus adapting the same for use in practically any location.

My invention is especially valuable for use in larger cities, and metropolitan districts where storage space for motor vehicles is at a premium, and where the placing of vehicles in storage and their removal therefrom with ease and facility is especially desirable.

My invention is an improvement upon the apparatus shown in my co-pending patent application, Serial No. 392,298, filed September 13, 1929.

Other features and advantages of my invention will appear more fully as I proceed with my specification.

In that form of device embodying the features of my invention shown in the accompanying drawings—

Figure 1 is a view in side elevation; Fig. 2 is a top plan view; Fig. 3 is a fragmentary view similar to Fig. 1, showing the platform raised; and Fig. 4 is a fragmentary enlarged view similar to Fig. 1 showing details of the dash pot and trigger mechanism.

In disclosing the invention, I shall show merely a single unit of storage space adapted to house two cars. This will suffice to illustrate the invention. It is to be understood, of course, that there may be as many of such units as desired.

As shown in the drawings, 10 indicates a supporting surface which, for example, may be the ground, the floor of a building, or the like. As here shown, it indicates specifically the ground; as my invention is especially adapted to be used in connection with storage where little or no building or structure is employed, use being made of the normal ground surface.

11 indicates, in general, an inclined supporting platform, here shown as formed of two parallel channel irons 12, 12, connected by a flat sheet metal member 13. The lower ends of the channel 12 which form tracks for the wheels of the vehicles are flush with the ground 10. $14^a$ indicate pivot points on which the platform 11 and channel members 12, 12 are pivoted on suitable posts 14, such pivot points lying substantially midway between the ends of the platform. The pivot point is high enough so that when the platform is elevated, as shown in Fig. 3, a second car $18^a$ can be stored under the platform on the ground or supporting surface 10.

Since the platform 11 is pivoted substantially midway between its ends, the weight of a car $18^a$ run up onto it can be used for elevating it. That is, after the center of mass of the car 18 passes the pivot points $14^a$, its weight can be used to depress the upper portion of the platform and raise the lower platform, in the nature of a teeter, to move the platform into the position shown in Fig. 3 so that a second car $18^a$ can be run under the same.

I also prefer to provide a counter-weight 15 on the upper end of the platform 11 which will substantially counter-balance the lower portion or even more than counter-balance the same.

I also provide a suitable latch mechanism with a trigger release adapted to hold the inclined platform 11 in the position shown in Fig. 1 until a car passes the pivot points $14^a$ and engages a trigger which releases the latch, allowing the weight of the car and/or the counter-weight 15 to raise the platform into the position shown in Fig. 3. The latch mechanism includes a toggle composed of two levers 16 and 17 with their adjacent ends pivotally attached at 19. The upper end of the lever 16 is pivotally attached at $16^a$ to the end of the platform 11. The lower end of the lever or arm 17 is pivotally attached at $17^a$ to a suitable support 20. When the members 16 and 17 are in alinement, as shown in Fig. 4, the platform 11 is located in the position shown in Fig. 1, which, for convenience, will be referred to as the lowered position. When the upper end of the platform 11 descends and the lower end is raised to bring the platform into the position shown in Fig. 3, this will be referred to as the raised position because in this position, a second car $18^a$ can go under the platform 11. The arm 17 is provided with an oblique extension $17^a$ connected by a spring 21 to the arm 16 to yieldingly hold the toggle in its straightened or extended position. 22 indicates a stop pin engaged by the extreme lower end $16^b$ of the arm 16 to limit motion of the toggle beyond the extended position.

23 indicates a connecting bar or link attached to the arm 16, which is connected by the lever 24 to the trigger 25 in one of the channels 12. When the trigger 25 is engaged by the front wheel of a vehicle, it is depressed, being free to pivot on the axis 26. This movement of the trigger is transmitted through the arm 24 to the connecting bar or line 23 to "break" the toggle, thus allowing the counter-weight 15 and/or the weight of the car 18 to raise the platform into the position shown in Fig. 3. The connecting bar 23 is provided with a slot 23$^a$ accommodating a pin 24$^a$ on the end of the crank or lever 24 so that after the toggle is "broken", it may move to its complete folded position, as shown in Fig. 3, as the platform rocks on the pivot points 14$^a$.

A suitable dash pot arrangement is provided to slow up movement of the platform. This includes a cylinder 30 filled with oil 31 in which operates a piston 32 with a small bleed or by-pass aperture 32$^a$. The piston 32 is connected by a piston rod 33 to the upper end of the platform 11.

In the operation of the device, the toggle is in extended position, as shown in Fig. 1. In this position, the counter-weight 15 may or may not be heavy enough to raise the platform by itself. In any event, the platform is prevented from going up by the extended toggle. A car 18 is then run up onto the platform until the front wheel engages the trigger 25. This releases the toggle, whereupon the weight 15 and/or the car 18 will raise the platform to the position shown in Fig. 3. A second car 18$^a$ can then be driven under the platform for storage, the first car 18 remaining on top.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A storage apparatus for vehicles including; a normally inclined vehicle-receiving platform with its lower end in substantial registry with a supporting surface and adapted to receive a vehicle for storage purposes driven up onto the same from said supporting surface, said platform being held in inclined position by releasable mechanism, said mechanism adapted to be released by movement of a vehicle on said platform, a fixed pivot for said platform removed from the upper end thereof and elevated above said supporting surface sufficiently to receive a second vehicle therebeneath for storage purposes; and means to move said platform on the axis of said pivot with a vehicle carried thereon, to raise the lower end of said platform to permit a second vehicle to be driven under said platform on said supporting surface in the same direction as the vehicle on the platform and into substantial registry therewith.

2. A storage apparatus for vehicles including; a normally inclined vehicle-receiving platform with its lower end in substantial registry with a supporting surface and adapted to receive a vehicle for storage purposes driven up onto the same from said supporting surface, said platform being held in position by releasable holding mechanism; a trigger on the platform adapted to be engaged by a wheel of a vehicle thereon; a connection between the trigger and the holding mechanism; a fixed pivot for said platform removed from the upper end thereof and elevated above said supporting surface sufficiently to receive a second vehicle therebeneath for storage purposes; and means to move said platform on the axis of said pivot with a vehicle carried thereon, to raise the lower end of said platform to permit a second vehicle to be driven under said platform on said supporting surface in the same direction as the vehicle on the platform and into substantial registry therewith.

3. A storage apparatus for vehicles including; a normally inclined vehicle-receiving platform with its lower end in substantial registry with a supporting surface and adapted to receive a vehicle for storage purposes driven up onto the same from said supporting surface; and a fixed pivot for said platform removed from the upper end thereof and elevated above said supporting surface sufficiently to receive a second vehicle therebeneath for storage purposes, the weight of the first-mentioned vehicle on the platform being utilized as it passes the pivot point to raise the lower end of the platform to permit said second vehicle to be driven under said platform on said supporting surface in the same direction as the vehicle on the platform and into substantial registry therewith.

MARCUS C. STEARNS.